(12) United States Patent
Fischer (10) Patent No.: US 9,587,553 B2
(45) Date of Patent: Mar. 7, 2017

(54) VOLUME-CONTROLLED FOUR-STROKE RECIPROCATING INTERNAL COMBUSTION ENGINE AND METHOD FOR OPERATING THE FOUR-STROKE RECIPROCATING INTERNAL COMBUSTION ENGINE

(71) Applicant: Bayerische Motoren Werke Aktiengesellschaft, Munich (DE)

(72) Inventor: Hubert Fischer, Mammendorf (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 197 days.

(21) Appl. No.: 14/514,541

(22) Filed: Oct. 15, 2014

(65) Prior Publication Data

US 2015/0027116 A1    Jan. 29, 2015

Related U.S. Application Data

(63) Continuation of application No. PCT/EP2013/054811, filed on Mar. 11, 2013.

(30) Foreign Application Priority Data

Apr. 18, 2012    (DE) .................. 10 2012 206 372

(51) Int. Cl.
*F02B 33/44*    (2006.01)
*F02B 33/06*    (2006.01)
(Continued)

(52) U.S. Cl.
CPC ............. *F02B 33/06* (2013.01); *F02B 29/04* (2013.01); *F02B 33/22* (2013.01); *F02B 37/00* (2013.01);
(Continued)

(58) Field of Classification Search
CPC .......... F02B 33/06; F02B 75/02; F02B 37/00; F02B 29/04; F02B 41/06; F02B 33/22;
(Continued)

(56) References Cited

U.S. PATENT DOCUMENTS 4,040,400 A    8/1977    Kiener
4,565,167 A    1/1986    Bryant
(Continued)

FOREIGN PATENT DOCUMENTS

AT    371 223 B    6/1983
CN    1382901 A    12/2002
(Continued)

OTHER PUBLICATIONS

International Search Report dated Jul. 26, 2013 (Three (3) pages).
(Continued)

*Primary Examiner* — Thomas Denion
*Assistant Examiner* — Thomas Olszewski
(74) *Attorney, Agent, or Firm* — Crowell & Moring LLP (57) ABSTRACT

The invention relates to a volume-controlled four-stroke reciprocating internal combustion engine comprising a first cylinder, in which a first piston that is operationally connected to a crankshaft via a first connecting rod, is arranged so as to be displaceable in a reciprocating motion, and at least one second cylinder, in which a second piston that is operationally connected to the crankshaft via a second connecting rod is arranged so as to be displaceable in a reciprocating motion. The engine further includes a fresh air tract for the second cylinder, in which an expansion/compression machine is arranged in the direction of flow of fresh air before a gas exchange inlet valve of the second cylinder, wherein the expansion/compression machine is the first
(Continued)

cylinder. The volume-controlled internal combustion engine as per the invention has great potential for saving fuel and thereby for reducing $CO_2$.

14 Claims, 8 Drawing Sheets

(51) Int. Cl.
*F02B 29/04* (2006.01)
*F02B 33/22* (2006.01)
*F02B 41/06* (2006.01)
*F02B 69/06* (2006.01)
*F02B 37/00* (2006.01)
*F02B 75/02* (2006.01)
*F02M 31/02* (2006.01)

(52) U.S. Cl.
CPC .............. *F02B 41/06* (2013.01); *F02B 69/06* (2013.01); *F02B 75/02* (2013.01); *F02M 31/02* (2013.01); *F02B 2075/027* (2013.01); *Y02T 10/146* (2013.01)

(58) Field of Classification Search
CPC ... F02B 69/06; F02B 2075/027; F02M 31/02; Y02T 10/146
USPC ........................................................ 60/605.1
See application file for complete search history.

(56) References Cited

U.S. PATENT DOCUMENTS

| | | | |
|---|---|---|---|
| 5,467,748 A | 11/1995 | Stockhausen | |
| 6,318,310 B1 | 11/2001 | Clarke | |
| 2007/0221145 A1* | 9/2007 | Forner | F01N 5/02 |
| | | | 123/41.01 |
| 2009/0056331 A1* | 3/2009 | Zhao | F02B 41/06 |
| | | | 60/524 |
| 2009/0301086 A1 | 12/2009 | Ralston | |
| 2009/0314005 A1* | 12/2009 | Messmer | F02F 1/4292 |
| | | | 60/792 |
| 2011/0303185 A1 | 12/2011 | Zajac et al. | |
| 2013/0340730 A1 | 12/2013 | Fischer | |

FOREIGN PATENT DOCUMENTS

| | | |
|---|---|---|
| CN | 1916385 A | 2/2007 |
| CN | 1928333 A | 3/2007 |
| DE | 10 2004 005 518 A1 | 9/2005 |
| DE | 10 2010 047 112 A1 | 9/2011 |
| DE | 10 2011 006 388 A1 | 10/2012 |
| GB | 2469939 A | 11/2010 |
| GB | 2478544 A | 9/2011 |

OTHER PUBLICATIONS

German Search Report dated Nov. 16, 2012, with Statement of Relevancy (Six (6) pages).
Chinese Office Action issued in Chinese counterpart application No. 201380014908.1 dated Dec. 31, 2015, with partial English translation (Sixteen (16) pages).

* cited by examiner

ELC partial load operation

Fig. 2c

ELC full load operation

Fig. 3a

ELC partial load operation

Fig. 3b

ELC full load operation

Fig. 3c full motor operation

Fig. 4a

Turbo ELC

Fig. 4b

Turbo ELC with full motor option

Turbo ELC with partial load operation

Fig. 5c full motor operation

Fig. 5d

Turbo ELC full load operation

Fig. 6

Turbo ELC load control process with internal VLC and full load option

VOLUME-CONTROLLED FOUR-STROKE RECIPROCATING INTERNAL COMBUSTION ENGINE AND METHOD FOR OPERATING THE FOUR-STROKE RECIPROCATING INTERNAL COMBUSTION ENGINE

CROSS REFERENCE TO RELATED APPLICATIONS

This application is a continuation of PCT International Application No. PCT/EP2013/054811, filed Mar. 11, 2013, which claims priority under 35 U.S.C. §119 from German Patent Application No. 10 2012 206 372.2, filed Apr. 18, 2014, the entire disclosures of which are herein expressly incorporated by reference.

BACKGROUND AND SUMMARY OF THE INVENTION

The invention relates to a volume-controlled four-stroke reciprocating internal combustion engine as well as a method for operating the four-stroke reciprocating internal combustion engine.

For the technical background, reference is made, for example, to the translation of German patent DE 696 00 937 T2, from which an adjustment of the camshaft phase for deactivation of a cylinder of a reciprocating internal combustion engine is known. This patent discloses a multi-cylinder four-stroke reciprocating internal combustion engine with a crankshaft and a plurality of pistons reciprocating in a plurality of cylinders. Furthermore, each cylinder of the internal combustion engine has at least one intake valve and one exhaust valve as well as a camshaft for actuating at least the exhaust valves. This internal combustion engine is characterized in that it also has the following features:

- a phase control mechanism for adjustment of the camshaft timing with regard to the rotational position of the crankshaft;
- a plurality of intake throttles, wherein one of the throttles is disposed near to and upstream of each of the intake valves; and
- a controller connected to the intake throttles and to the phase control mechanism for the camshaft for deactivation of at least some of the cylinders by actuation of the phase control mechanism and the inlet throttles in such a way that for each cylinder to be deactivated the intake throttle is closed and the camshaft controller is adjusted in such a way that the position with maximum exhaust valve lift is moved from approximately 90° before the top dead center in the exhaust stroke to a point at which the maximum valve lift occurs either approximately at top dead center of the exhaust stroke or approximately at bottom dead center of the expansion stroke.

The starting point for the invention is the German patent application No. DE 10 2011 006 388.9 from which a method for operating a volume-controlled internal combustion engine and an internal combustion engine provided therein are known. The internal combustion engine has at least two cylinders, as well as an intake duct and an exhaust gas system. An expansion/compression machine of which the output shaft can be coupled to an output shaft of the internal combustion engine and/or to a drive shaft of an electric machine is disposed in the intake tract in the direction of flow of the fresh air before an intake valve of the internal combustion engine. Furthermore, a heat exchanger is disposed on the exhaust gas system. The method is characterized in that before the fresh air flows into the expansion/compression machine it is heated in the heat exchanger by the exhaust gas from the internal combustion engine. The efficiency of the internal combustion engine is substantially improved by the method for operating the volume-controlled internal combustion engine.

In the above-mentioned patent application, it is stated that by the use of the expansion process not only are the charge exchange losses avoided but, in connection with the exhaust gas heat exchanger according to the invention, clear efficiency advantages and thus fuel consumption advantages are achieved. Furthermore, this technology can be combined particularly well with exhaust gas turbocharging. Therefore, in this patent application the efficient load control (ELC) of a volume-controlled internal combustion engine is also mentioned.

Similar to the way in which the power of the internal combustion engine can be increased by a mechanically or electrically driven compressor in the intake tract by compression of the fresh air, by means of an expansion machine, which can simultaneously be designed as a compression machine instead of the throttle valve, the fresh air can be "diluted", i.e. can be adjusted to a lower density and thus the power of the internal combustion engine can be reduced. As a result, throttle losses of a conventional throttle valve are practically entirely avoided. The efficiency advantage is comparable to a variable valve control, as has already been used for example by Bayerische Motoren Werke AG for over a decade in mass production under the name "Valvetronic." The work which is performed in the expansion machine can be delivered by way of a mechanical coupling (for example a belt drive) to the internal combustion engine or to the crankshaft thereof or to an electric generator.

As is also stated in the above-mentioned patent application, further increases in efficiency in the partial load of the internal combustion engine can be achieved if thermal energy is transferred to the fresh air by way of the heat exchanger on the exhaust gas system. As a result, the volume flow of the fresh air is thereby increased and also, proportionally thereto, the work which is performed in the expansion/compression machine. After the expansion/compression machine, the fresh air is cooled by a cooler, e.g. a charge air cooler, again to the usual fresh air temperature, before it is fed to the internal combustion engine for combustion. Thus, efficiencies which are clearly above those of a stroke-and/or time-variable valve drive can be achieved in the partial load range of a volume-controlled internal combustion engine. This corresponds to the known prior art.

A disadvantage of this prior art is the use of a separate expansion/compression machine which requires installation space and incurs production costs as well as an expensive coupling to the power supply.

The object of the present invention is to provide a generic volume-controlled four-stroke reciprocating internal combustion engine which does not have a separate expansion/compression machine, and also suitable methods for operating this four-stroke reciprocating internal combustion engine.

DEFINITIONS

1. VLC: Volumetric Load Control (FIG. 1):
   According to the invention this is an internal VLC without a separate expansion/compression machine.

The second cylinder is conventionally operated by the volume-controlled four-stroke method. Due to the variable timing of the gas exchange valves the first cylinder can be operated as an expansion machine or as a compression machine. In the two-stroke method the first cylinder is operated as a compression machine. The quantity of fresh air required for a load point of the second cylinder is controlled via the first cylinder, also referred to as the VLC cylinder. As a result, in partial load operation the charge exchange losses can be compensated for, in a similar manner to a stroke- and/or time-variable valve drive.

2. ELC: Efficient Load Control (FIGS. 2a to 2c):

This is a combination of the internal VLC process according to the invention with exhaust gas heat recovery.

In the partial load of the internal combustion engine, the fresh air is heated before the expansion in the first cylinder, or VLC cylinder, by means of the exhaust gas heat exchanger. In this way, the recovered expansion work is increased and the overall efficiency is improved.

3. ELC with Full Motor Option: Efficient Load Control with Full Motor Option (FIGS. 3a to 3c):

In the ELC with full motor option, the first cylinder or VLC cylinder can be changed over from two-stroke VLC operation into four-stroke combustion mode by a suitable and known variability in the gas exchange valve control. Full motor operation is possible by switching over the routing of fresh air and exhaust gas for the first cylinder or VLC cylinder. Full motor operation means that all cylinders of the internal combustion engine are operated in fired mode.

4. Charging ELC Load Control: Efficient Load Control with Full Motor Option and Charging (FIGS. 4a and 4b):

The ELC load control can be combined very well with charging (mechanical charging or exhaust gas turbocharging). In this way, the pressure before the first cylinder, the VLC cylinder, can additionally be raised and the range of improvement of the efficiency can be extended to higher loads of the internal combustion engine by exhaust gas energy recovery. By switching over the routing of fresh air and exhaust gas for the first cylinder or VLC cylinder full motor operation is also possible with the charging ELC load control.

Thus, a VLC and ELC process inside the internal combustion engine are represented by the configuration according to the invention. Thus, the internal VLC process and the ELC process are extensions of the simple principle of deactivation of a cylinder, such as is known for internal combustion engines with a larger number of cylinders for improvement of the partial load consumption. Possible embodiments, such as are illustrated in FIGS. 1 to 6 in conjunction with Table 1, are explained below. Four-stroke internal combustion engines in a V configuration, in which the cylinders are deactivated bank by bank, are also particularly suitable for the VLC and ELC process.

Explanation of the Deactivation of Cylinders:

In a volume-controlled load control a consumption advantage can be achieved in the partial load, as some of the cylinders are deactivated for minimization of the power loss in these cylinders and the rest of the cylinders are operated in a higher load state with lower charge exchange losses. Typically the cylinders to be deactivated are deactivated in such a way that the fired cylinders have a uniform ignition interval, so that the smoothest possible running is achieved. Thus for the conventional ignition sequence of a six-cylinder internal combustion engine this results in the disconnection of a group of three cylinders, in the example shown in FIGS. 5a to 5d this is the group of cylinders designated by 2. The deactivation of the cylinders typically takes place in such a way that the fuel injection for these cylinders is switched off and the valve lift is deactivated by a suitable device, such as known from the prior art, and the gas exchange valves remain closed.

VLC and ELC Process According to the Invention:

The internal implementation of the VLC and ELC process is based on the idea according to the invention of using the cylinders deactivated in the cylinder deactivation for the process of expansion or also of compression of the fresh air (volumetric load control). FIGS. 5a to 5d show for example a possible embodiment in which both the ELC process in three-cylinder operation and also full motor operation with all cylinders is possible. A more precise functional description is given in the description of the drawings.

Figure 1:
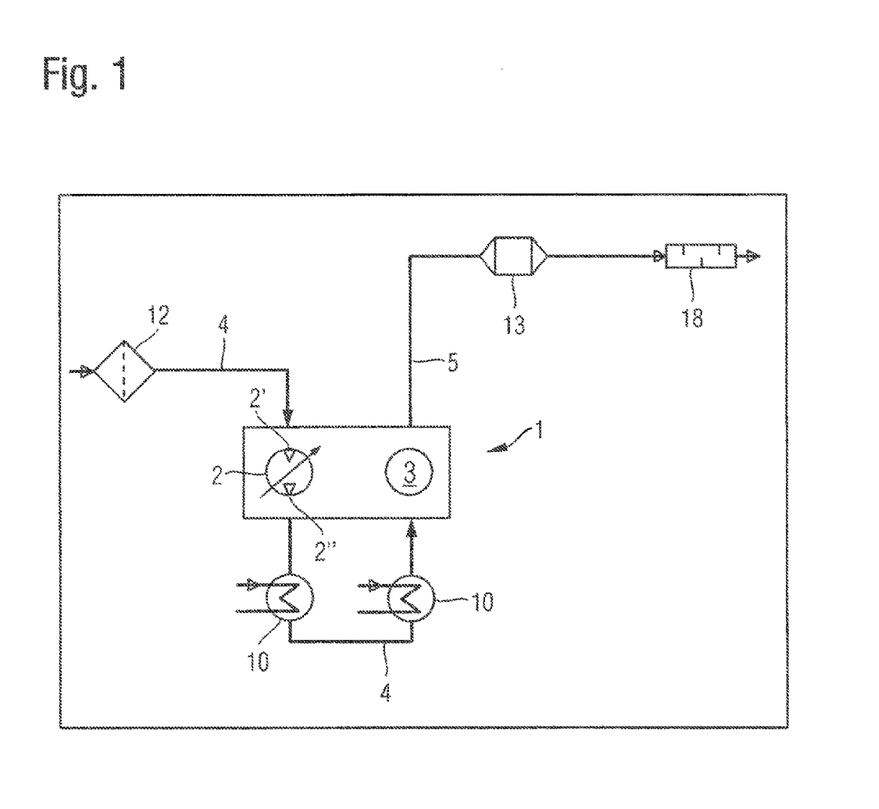
FIG. 1 shows schematically an internal volumetric load control (VLC operation) according to the invention for a two-cylinder internal combustion engine.

Thus, FIG. 1 shows the gas path for the VLC operation of a two-cylinder internal combustion engine (volumetric load control). In order that the unfired cylinder can be used in the VLC process, it is preferably operated in the two-stroke process, i.e. inlet and outlet gas exchange valves open in each working cycle. The two-stroke mode of operation doubles the working volume relative to the fired cylinder. A particularly advantageously configuration is obtained if the flow direction in the VLC cylinder is reversed (FIGS. 3a, 5b), i.e. the flow passes through from the outlet side to the inlet side and the charge air cooler (or fresh air cooler) is divided in two. In order to provide switchability between VLC and full motor operation, in the VLC mode the VLC cylinder (FIG. 3c) or the VLC cylinder group (FIG. 5c) must be separated by an actuating element from the exhaust gas system of the fired cylinder or the fired cylinders and the throttle valve must be closed. For full motor operation the valve drive in the VLC cylinders must be switched to normal operation, i.e. four-stroke operation, the exhaust gas valve and the throttle valve must be opened and the valve located in the VLC air path must be closed.

The greatest efficiency advantage can be achieved if the valve drive in the VLC cylinders is designed to be variable so that optimal expansion conditions can be set. Then a charged 3-cylinder VLC operation (FIG. 5b) is possible, wherein the VLC cylinders can be used for an even higher degree of charging or for improved response.

To Summarize, it May be Stated:

Significant efficiency improvements and thus fuel consumption advantages can be achieved by the expansion process in the intake path of a volume-controlled internal combustion engine in conjunction with an exhaust gas heat exchanger (ELC process) connected upstream and a fresh air cooler connected downstream. The method according to the invention can advantageously be implemented inside the internal combustion engine. If the expansion machine can also be operated as a compression machine, a general load control process is obtained which enables a large load range of the internal combustion engine with outstanding partial load fuel consumption. In combination with charging such as, for example, exhaust gas turbocharging (turbo ELC process), the fuel consumption advantage can be further extended to higher loads of the internal combustion engine and with an additional compressor function the response behavior of the internal combustion engine (response) can be improved.

The invention is explained in greater detail below with reference to five embodiments in 14 figures and a table.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4b shows schematically a basic structure for an efficient load control with charging and full motor option for the two-cylinder internal combustion engine according to FIG. 4a.

Table 1 shows possible modes of operation for the two-cylinder internal combustion engine according to FIG. 6.

DETAILED DESCRIPTION OF THE DRAWINGS

In FIGS. 1 to 6 and Table 1 below, the same reference signs apply to the same components.

An internal volumetric load control (VLC operation) according to the invention for a two-cylinder internal combustion engine is shown in FIG. 1.

A basic structure for a reciprocating internal combustion engine with an efficient load control (ELC operation) is illustrated each case in FIGS. 2a, 3a, 4a and 5a and 6.

For better clarity only FIGS. 2a, 3a, 4a and 5a are fully provided with reference signs. Only deviations from these reference signs are shown separately in the rest of the figures. Active conduits are illustrated by a solid line and inactive conduits are illustrated by a broken line. A flow direction of an (exhaust) gas is indicated by small arrows.

FIG. 1 shows schematically a volume-controlled four-stroke reciprocating internal combustion engine 1 according to the invention with a first and a second cylinder 2, 3 for a VLC operation (volumetric load control). The first cylinder 2, also referred to as a VLC cylinder, has a gas exchange inlet side 2' and a gas exchange outlet side 2", in each of which at least one gas exchange valve is disposed. This is illustrated symbolically by a triangle on the inlet side and a triangle on the outlet side. A variable air dilution or air compression (expansion or compression) through the first cylinder 2 is illustrated symbolically by an arrow. The gas exchange valves preferably have a stroke- and/or time-variable valve drive and can be switched from a four-stroke operation to a 2-stroke operation and vice versa.

In the first cylinder 2 a first piston (not shown) operatively connected to a crankshaft (not shown) via a first connecting rod (also not shown) is disposed so as to be displaceable in a reciprocating motion. In the second cylinder 3 a second piston (not shown) operatively connected to the crankshaft (not shown) via a second connecting rod is disposed so as to be displaceable in a reciprocating motion.

In the operation of the internal combustion engine 1, fresh air is conveyed through an intake silencer 12 to the first cylinder 2, from there onwards through two charge air coolers 10 into the second cylinder 3. In the second cylinder 3 the fresh air is burned with fuel; the exhaust gases are then discharged into an exhaust gas tract 5, are cleansed of pollutants in an exhaust gas purification system 13 and are exhausted through a sound absorber 18 into the environment.

According to the invention, the first cylinder 2 operates as an expansion/compression machine, i.e. the fresh air can be expanded or compressed by the first cylinder 2. If the cylinder 2 is operated as a compression machine, the gas exchange valves are preferably operated in two-stroke operation.

By this expansion or compression, the fresh air is adjusted to a density which is needed by the second cylinder 3 for a specially required load or power of the internal combustion engine 1. As already mentioned, the basic structure for the internal volumetric load control (VLC operation) according to the invention for a two-cylinder internal combustion engine is shown in FIG. 1.

With the internal combustion engine 1 illustrated in FIG. 1, a method for operating the reciprocating internal combustion engine is possible, said method being characterized by the following method steps at a low to medium required load and/or power:
- fired operation of the second cylinder 3,
- discharge of the exhaust gas from the second cylinder 3 in the exhaust gas tract 5,
- drawing in of fresh air by the first cylinder 2,
- expansion of the fresh air,
- delivering the expanded fresh air to the second cylinder 3.

The explanation with regard to FIG. 1 also applies also to all further FIGS. 2 to 6, in which advantageous modifications of the invention are illustrated.

Figure 2A:
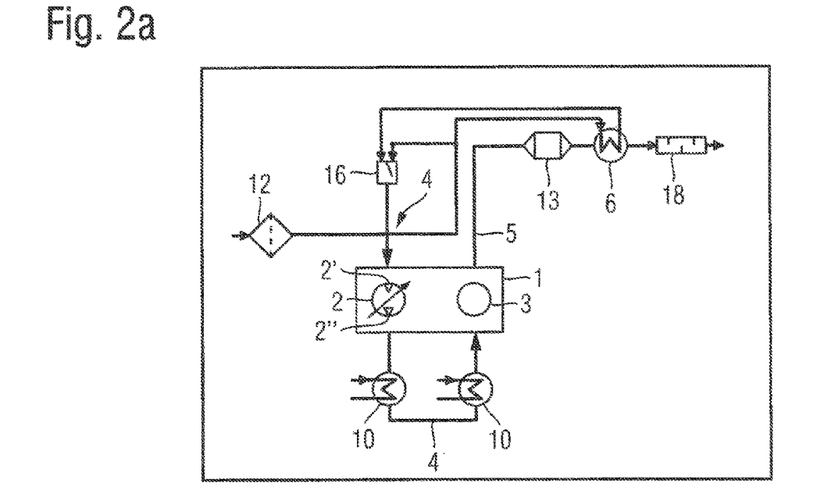
FIG. 2a shows schematically a basic structure for an efficient load control (ELC operation) for a two-cylinder internal combustion engine.

FIG. 2a shows schematically a basic structure for an efficient load control (ELC operation) for a two-cylinder internal combustion engine 1. By comparison with the two-cylinder internal combustion engine in FIG. 1, the two-cylinder internal combustion engine 1 in FIG. 2a has an additional heat exchanger 6 in the exhaust gas tract 5 and a fresh air temperature regulator 16 in the fresh air tract 4. Fresh air can be conveyed to the first cylinder 2 in two ways:

1. coming from the intake silencer 12 through the heat exchanger 6 and onwards to the fresh air temperature regulator 16 and/or
2. after the intake silencer 12 and before the heat exchanger 6 directly into the fresh air temperature regulator 16.

In the fresh air temperature regulator 16 at least one closure element, for example a valve, is provided which can alternately open or close the two air inlets, so that in the fresh air temperature regulator 16 any fresh air temperature can be set which may be between the ambient air temperature and the maximum temperature heated by the heat exchanger 6.

Figure 2B:
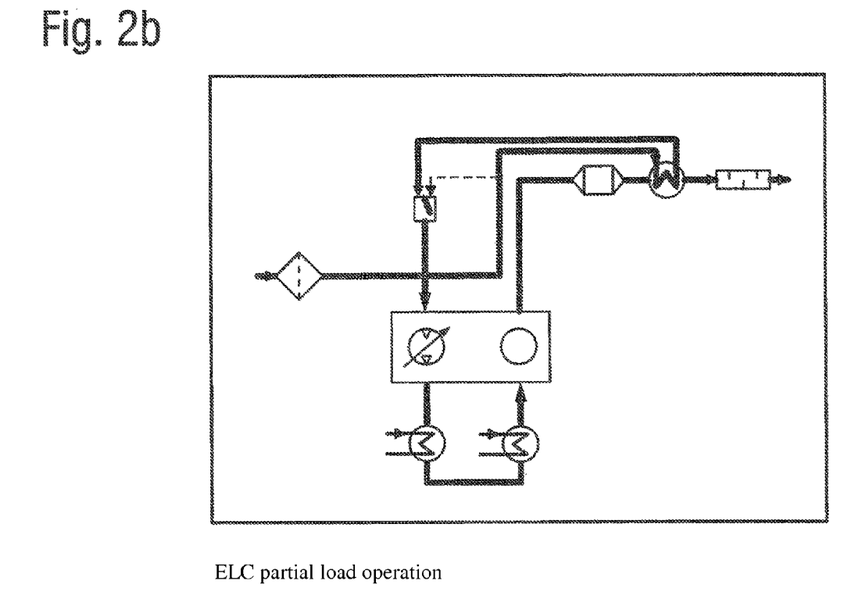
FIG. 2b shows schematically an efficient load control for the two-cylinder internal combustion engine according to FIG. 2a in an ELC partial load operation.

FIG. 2b shows schematically the efficient load control for the two-cylinder internal combustion engine according to FIG. 2a for an ELC partial load operation. As can be seen from FIG. 2b, in a partial load of the internal combustion engine 1 the direct fresh air path is deactivated after the intake silencer 12 and before the heat exchanger 6, illustrated by a broken line. This means that in ELC partial load operation fresh air preheated by the heat exchanger 6 is used predominantly or exclusively. In this case the energy recovered through the expansion in the first cylinder 2 is transmitted directly from the first piston and the first connecting rod to the crankshaft and is superimposed on the kinetic energy generated by the second cylinder 3.

Figure 2C:
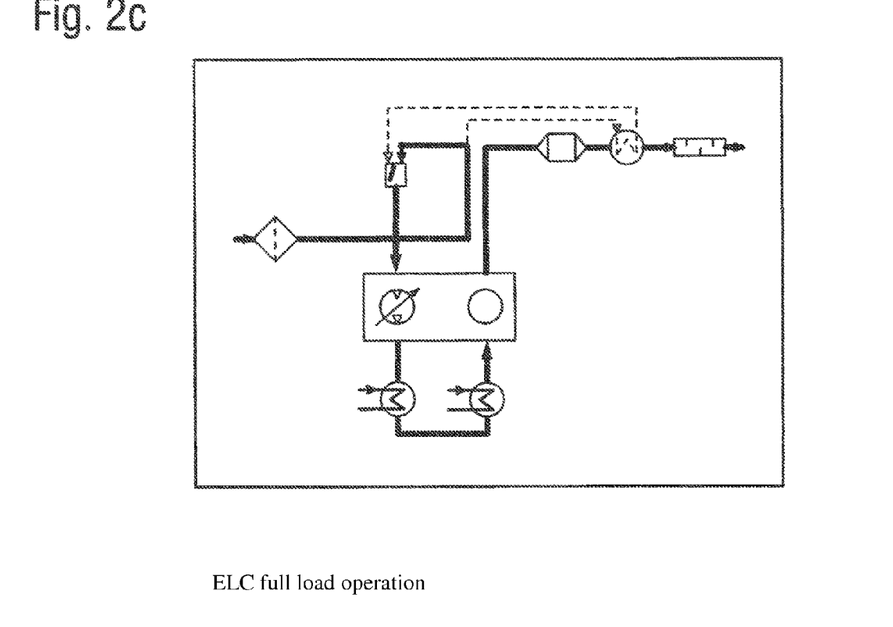
FIG. 2c shows schematically a load control for the two-cylinder internal combustion engine according to FIG. 2a in a full load operation.

FIG. 2c shows schematically the efficient load control for the two-cylinder internal combustion engine according to FIG. 2a for an ELC full load operation. In contrast to FIG. 2b, the fresh air path through the heat exchanger 6 is deactivated, again illustrated by a broken line. This means that in the ELC full load operation the second cylinder is filled with fresh air compressed by the first cylinder 2 and cooled by the charge air cooler 10.

With the reciprocating internal combustion engine 1 illustrated in FIGS. 2a to 2c an additional method step can be carried out:
heating the fresh air in the heat exchanger 6 before the fresh air is delivered to the first cylinder 2.

Figure 3A:
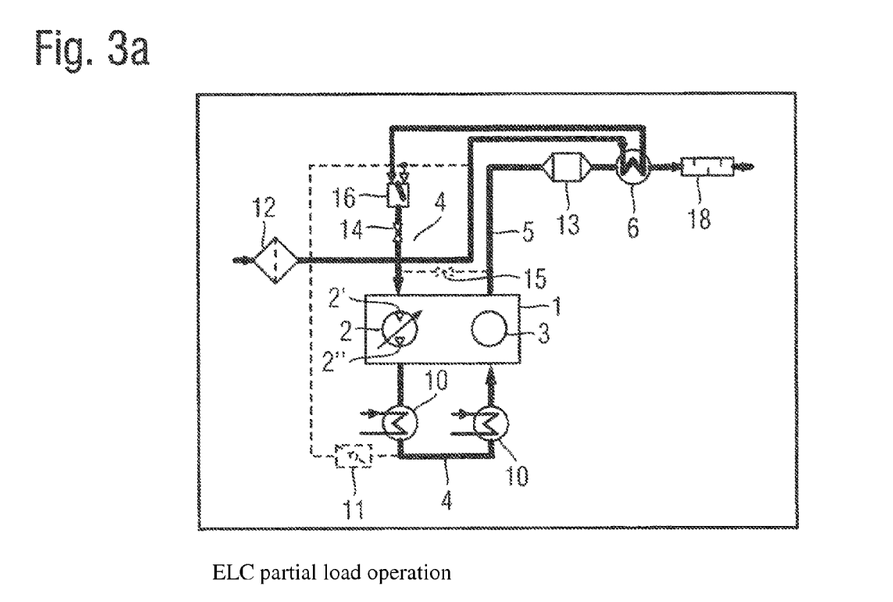
FIG. 3a shows schematically a basic structure for an efficient load control with full motor option for a two-cylinder internal combustion engine in an ELC partial load operation.

FIG. 3a shows schematically a basic structure for the efficient load control with a full motor option for the two-cylinder internal combustion engine 1 according to FIG. 2a in an ELC partial load operation. For the full motor option the internal combustion engine 1 in FIG. 3a differs from the internal combustion engine 1 in FIG. 2a in that:
the gas exchange inlet side 2' and the gas exchange outlet side 2" of the first cylinder are interchangeable, and
the fresh air tract 4 between the intake temperature regulator 16 and the gas exchange outlet side 2" can be divided by a second actuating element 14, and
the fresh air tract 4 can be connected by means of a first actuating element 11 to the gas exchange inlet side of the first and second cylinder 2, 3, and
the gas exchange outlet side 2" of the first cylinder can be connected by means of a third actuating element 15 to the exhaust gas tract 5 before the heat exchanger 6, and
the first cylinder 2 can be operated in a four-stroke operation.

As can be seen in FIG. 3a, in the ELC partial load operation the direct path of the fresh air in the fresh air tract 4 after the intake silencer 12 and before the heat exchanger 6 is deactivated by means of the first actuating element 11, for example a throttle valve, at the fresh air tract 4 before the second cylinder, as illustrated by a broken line. The second actuating element 14 is opened and the third actuating element 15 is closed. Thus this mode of operation, the ELC partial load operation, again corresponds to the representation in FIG. 2b.

Figure 3B:
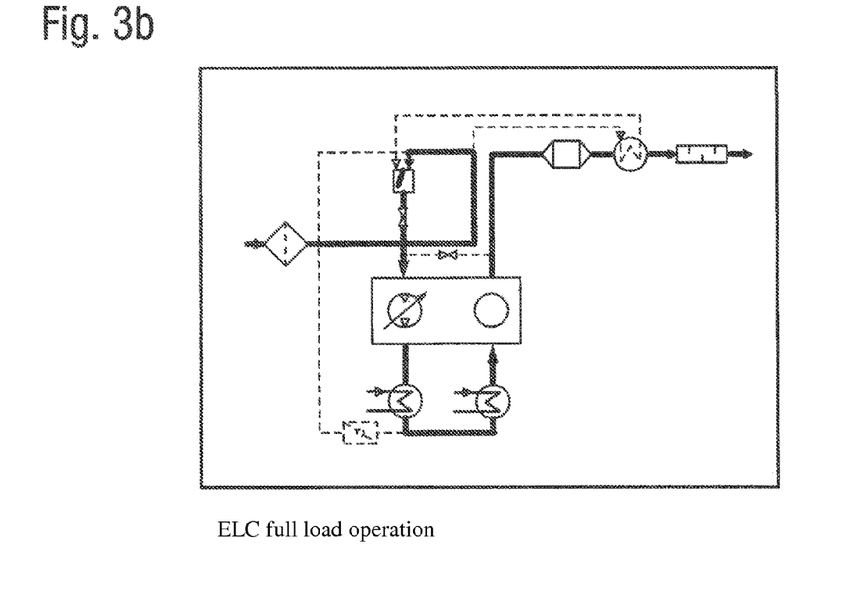
FIG. 3b shows schematically a load control for the two-cylinder internal combustion engine according to FIG. 3a in a full load operation.

FIG. 3b shows schematically the efficient load control with full motor option for the two-cylinder internal combustion engine according to FIG. 3a in an ELC full load operation. As can be seen in FIG. 3b, in this case as in FIG. 2c the fresh air path is deactivated by means of the heat exchanger 6. Furthermore the first actuating element 11 and the third actuating element 15 are closed. Thus in turn the fresh air path according to FIG. 2c is produced.

Figure 3C:
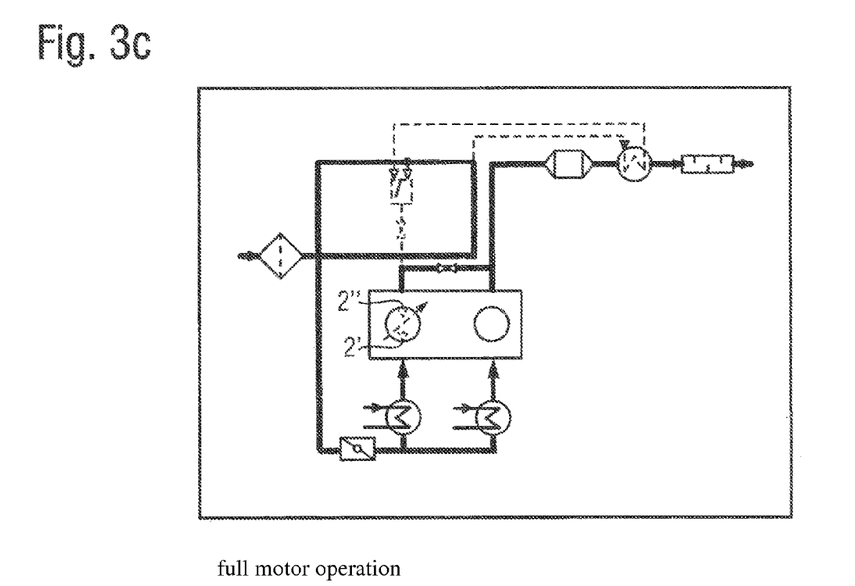
FIG. 3c shows schematically a load control for the two-cylinder internal combustion engine according to FIG. 3a in a full motor operation.

FIG. 3c shows schematically the efficient load control with full motor option for the two-cylinder internal combustion engine according to FIG. 3a in a full motor operation. In contrast to FIG. 3a and FIG. 3b, the fresh air path is now opened by means of the first actuating element 11. The second actuating element 14 is closed and the third actuating element 15 is opened. As a result the fresh air after the intake silencer 12 passes by means of the first actuating element 11 to both cylinders 2, 3, wherein the gas exchange inlet side and the gas exchange outlet side of the first cylinder are interchanged. Thus, the intake tract of the first cylinder 2 is transformed partially into a new exhaust gas tract for the first cylinder 2, which is now connected to the exhaust gas tract 5 of the second cylinder 3 so as to convey exhaust gas. In the full motor operation illustrated in FIG. 3c, both cylinders 2, 3 are operated in fired mode in the four-stroke process.

With this full motor mode of operation illustrated in FIG. 3c the following method can now be carried out at high load and/or power of the internal combustion engine 1:
opening of the first actuating element 11 and closing of the second actuating element 14 and opening of the third operating element 15 and fired operation of the first and second cylinder 2, 3 in a four-stroke operation,
discharge of the exhaust gases from the first and second cylinder 3 in the exhaust gas tract 5.

Figure 4A:
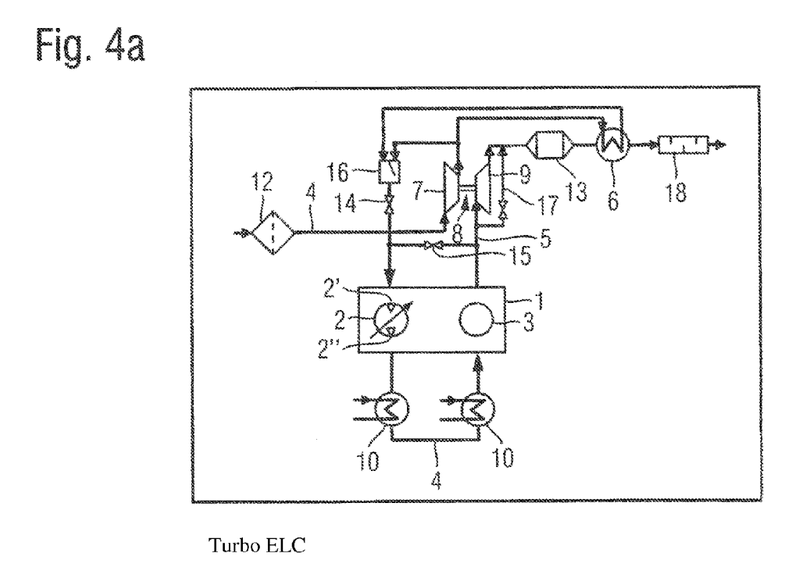
FIG. 4a shows schematically a basic structure for an efficient load control with charging for a two-cylinder internal combustion engine.

FIG. 4a shows schematically a basic structure for the efficient load control with charging for a two-cylinder internal combustion engine. FIG. 4a mostly corresponds to the internal combustion engine 1 according to FIG. 2a, but a compressor 7 of a turbomachine 8 is disposed in the fresh air tract 4 in the flow direction of the fresh air before the heat exchanger 6. The turbomachine 8 is preferably an exhaust gas turbocharger and a turbine 9 of the exhaust gas turbocharger is disposed in the exhaust gas tract 5, in the flow direction of the exhaust gas before the heat exchanger 6. For bypassing the turbine 9 as a function of the load point a wastegate 17 is provided with a shutoff element which is not identified by a reference sign.

Figure 4B:
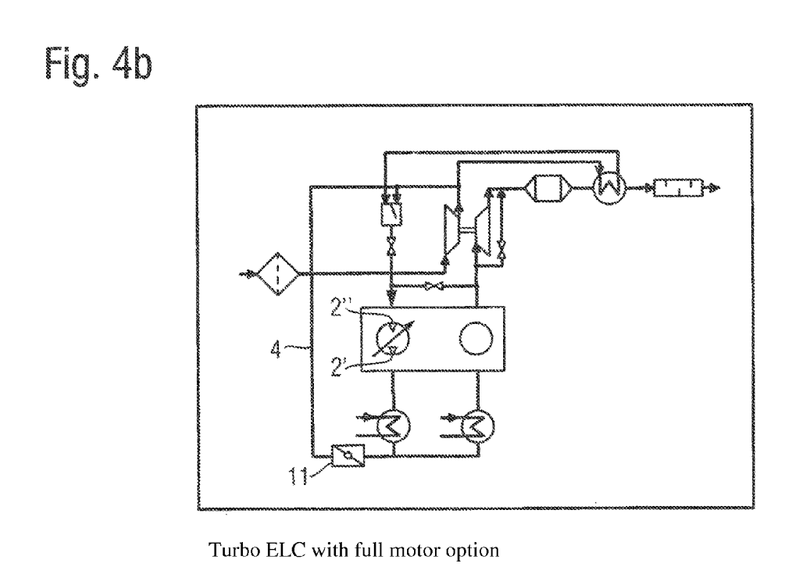

FIG. 4b shows schematically the efficient load control with charging and full motor option for the two-cylinder internal combustion engine according to FIG. 4a. FIG. 4b differs from FIG. 4a in that the inlet side 2' and the outlet side 2" of the first cylinder 2 are again interchanged and thus a full motor operation is possible, i.e. both cylinders in the four-stroke operation are operated in fired mode. The basic structure and the mode of operation correspond to those in FIGS. 3a to 3c.

With the basic structure illustrated in FIGS. 4a and 4b the following method step can be additionally carried out in the partial load operation of the internal combustion engine 1:
compressing the fresh air by the compressor 7 before heating in the heat exchanger 6.

Figure 5A:
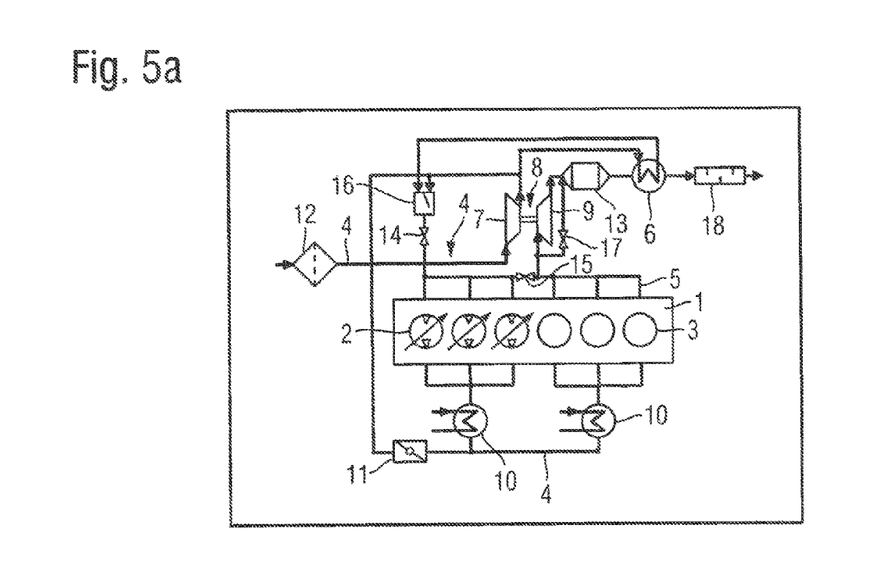
FIG. 5a shows schematically a basic structure for an efficient load control with charging and full motor option for a six-cylinder internal combustion engine.

FIG. 5a shows schematically an efficient load control with charging and full load option for a six-cylinder internal combustion engine. The details of FIGS. 4a and 4b again apply, with the difference that three cylinders are combined into a first group of cylinders 2 and three cylinders are combined into a second group of cylinders 3.

Figure 5B:
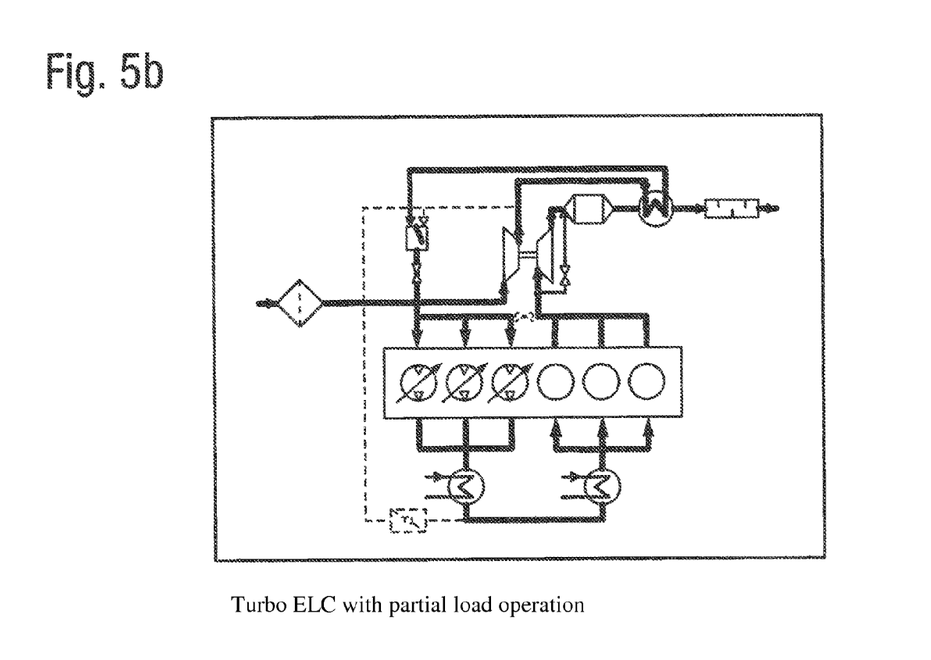
FIG. 5b shows schematically an efficient load control with charging for the six-cylinder internal combustion engine according to FIG. 5a in a partial load operation.

FIG. 5b shows schematically an efficient load control with charging and full load option in a partial load operation for the six-cylinder internal combustion engine according to FIG. 5a.

Figure 5C:
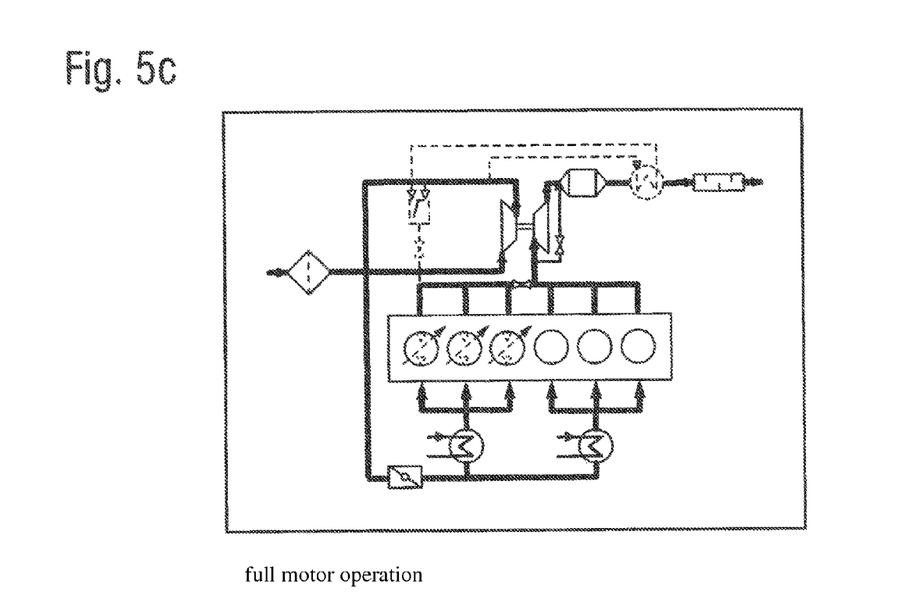
FIG. 5c shows schematically a load control for the six-cylinder internal combustion engine according to FIG. 5a in a full motor operation.

FIG. 5c shows schematically a load control with charging and full load option in a full motor operation for the six-cylinder internal combustion engine according to FIG. 5a.

Figure 5D:
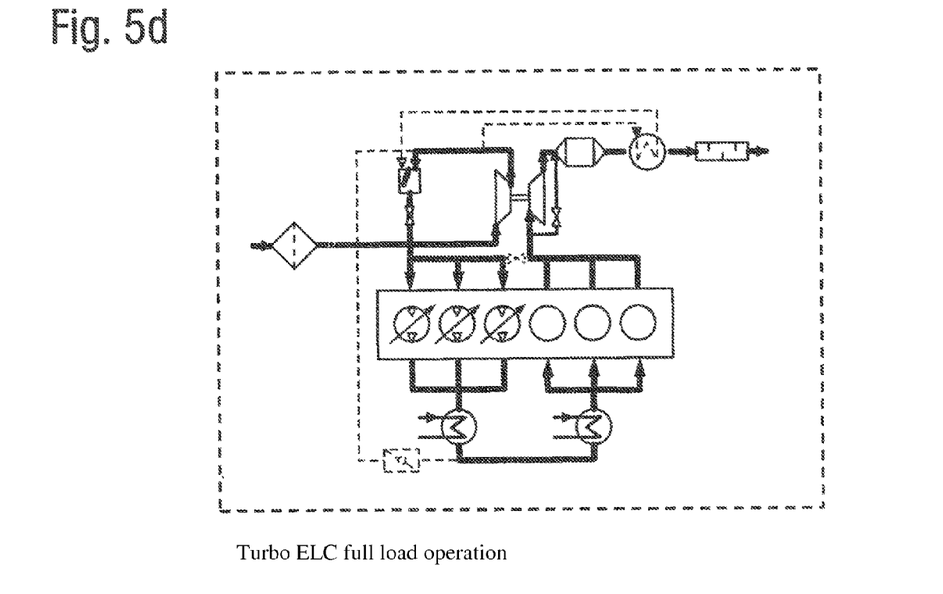
FIG. 5d shows schematically a load control for the six-cylinder internal combustion engine according to FIG. 5a in a full load operation.

FIG. 5d shows schematically a load control with charging and full load option for a full load operation for the six-cylinder internal combustion engine 1 according to FIG. 5a.

Figure 6:
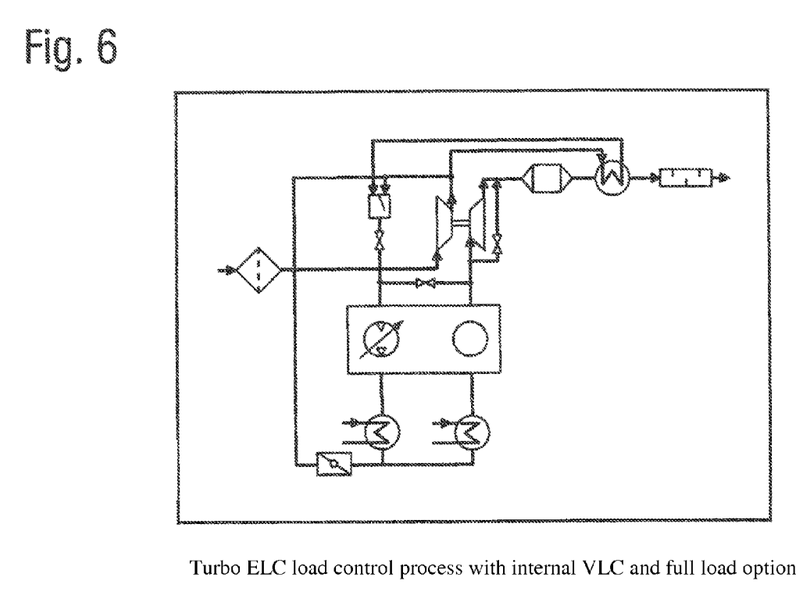
FIG. 6 shows schematically a basic structure for an efficient load control with charging and full motor option for a two-cylinder internal combustion engine (corresponding to FIG. 4b).

FIG. 6 again shows schematically an efficient load control with charging and full load option for a full load operation for a two-cylinder internal combustion engine 1. FIG. 6 corresponds to the representation in FIG. 4b. The details given for FIG. 4b apply here.

Table 1 shows a listing for different modes of operation of the turbo ELC load control process according to the basic structure in FIG. 6. The first column shows the required load on the internal combustion engine 1 which ranges from low partial load to the full motor operation. The following columns show the associated operating states of the heat exchanger 6, the fresh air temperature regulator 16, the second actuating element 14, the first cylinder 2, the third actuating element 15, the wastegate 17 and the first actuating element 11.

Modes of Operation of the Turbo ELC Load Control Process:

TABLE 1

| Load | AAWT (6) | ATR (16) | ALKL (14) | VLC | AGKL (15) | WG (17) | DK (11) |
|---|---|---|---|---|---|---|---|
| low partial load | active | hot | open | expansion | closed | open | closed |
| medium partial load | active | hot | open | expansion | closed | optimal | closed |
| medium load | active | hot | open | expansion | closed | closed | closed |
| high load | passive | cold | open | optimal | closed | optimal | closed |
| boost/transient | passive | cold | open | compression | closed | closed | closed |
| full motor | passive | passive | closed | 4-stroke comb. | open | optimal | open |

With reference to the switching and operating states shown in Table 1, the internal combustion engine 1 according to the invention can be operated fuel-efficiently over a wide operating range.

With the embodiment in FIG. 6, a method for operating a reciprocating internal combustion engine can be presented, said method being characterized by the following method steps at a low to higher required load and/or power:
fired operation of the second cylinder 3,
discharge of the exhaust gas from the second cylinder 3 in the exhaust gas tract 5,
heating the fresh air in the heat exchanger 6,
delivering the heated fresh air to the first cylinder 2,
expanding and cooling the fresh air,
delivering the expanded fresh air to the second cylinder 3.

An increased efficiency is achieved by the following method step:
operating the first cylinder 2 in a two-stroke operation.

A wider operating range is achieved by the following method step:
compressing the fresh air by the compressor 7 before heating in the heat exchanger 6.

With the following method step a turbo lag can be eliminated:
compressing the fresh air by the first cylinder 2 after heating in the heat exchanger 6.

Furthermore the reciprocating internal combustion engine can be operated with the following method steps at medium to high required load and/or power:
fired operation of the second cylinder 3,
discharge of the exhaust gas from the second cylinder 3 in the exhaust gas tract 5,
heating the fresh air in the heat exchanger 6,
delivering the heated fresh air to the first cylinder 2,
expanding and cooling the fresh air,
delivering the expanded fresh air to the second cylinder 3,
With a higher required load and/or power, opening of the first actuating element 11 and closing of the second actuating element 14 and opening of the third operating element 15 and operation of the first cylinder 2 in a fired four-stroke operation.

An even wider operating range is achieved by the following method step:
compressing the fresh air by the compressor 7 before heating in the heat exchanger 6.

According to the invention significant efficiency improvements and thus fuel consumption advantages can be achieved by the expansion process in the intake path of the volume-controlled internal combustion engine 1 in conjunction with the exhaust gas heat exchanger 6 connected upstream and the fresh air cooler 10 connected downstream. The method can be implemented both with an external expansion/compression machine but also according to the invention inside the internal combustion engine, by means of at least one cylinder (VLC cylinder) operated according to the invention. If the expansion machine can also be operated additionally as a compressor, a general load control process is obtained which enables a large load range of the internal combustion engine 1 with outstanding partial load fuel consumption. In combination with for example exhaust gas turbocharging, the fuel consumption advantage can be extended to higher loads and with an additional compressor function the response behavior (response) of the internal combustion engine 1 can be significantly improved.

LIST OF REFERENCE NUMERALS

1. internal combustion engine
2. first cylinder
2' gas exchange inlet side of first cylinder
2" gas exchange outlet side of first cylinder
3. second cylinder
4. fresh air tract
5. exhaust tract
6. heat exchanger
7. compressor
8. turbomachine 9. turbine
10. charge air cooler
11. first actuating element
12. intake silencer
13. exhaust gas purification system
14. second actuating element
15. third actuating element
16. fresh air temperature regulator
17. wastegate
18. sound absorber

ABBREVIATIONS

AGD intake silencer (12)
ATL exhaust gas turbocharger (8)
ATR intake temperature regulator (16)
ALKL intake air valve (14)
VLC volumetric load control
DK throttle valve (11)
ALK intake air cooler (10)
AGKL exhaust gas valve (15)
WG wastegate (17)
KAT catalyst (13)
AAWT heat exchanger (16)
SD sound absorber (18)

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A volume-controlled four-stroke reciprocating internal combustion engine comprising:
   a first cylinder, in which a first piston operatively connected to a crankshaft via a first connecting rod is disposed so as to be displaceable in a reciprocating motion;
   a second cylinder, in which a second piston operatively connected to the crankshaft via a second connecting rod is disposed so as to be displaceable in a reciprocating motion;
   a fresh air tract for the second cylinder, in which an expansion/compression machine is disposed in a direction of flow of uncompressed fresh air before a gas exchange inlet valve of the second cylinder; and
   an exhaust tract for the second cylinder, wherein the expansion/compression machine is the first cylinder,
   wherein a heat exchanger is disposed on the exhaust gas tract, wherein said flow of uncompressed fresh air, before flowing through the expansion/compression machine, is capable of being heated in the heat exchanger by the exhaust gas from the internal combustion engine.

2. The reciprocating internal combustion engine according to claim 1, wherein a fresh air temperature regulator is disposed in the fresh air tract after the heat exchanger and before the expansion/compression machine.

3. The reciprocating internal combustion engine according to claim 1, wherein a valve drive is provided for the first and the second cylinder, wherein the valve drive for the first and the second cylinder is separable and the first cylinder is operable in a two-stroke operation.

4. The reciprocating internal combustion engine according to claim 1, wherein the first cylinder is operable as a compressor.

5. A volume-controlled four-stroke reciprocating internal combustion engine comprising:
   a first cylinder, in which a first piston operatively connected to a crankshaft via a first connecting rod is disposed so as to be displaceable in a reciprocating motion;
   a second cylinder, in which a second piston operatively connected to the crankshaft via a second connecting rod is disposed so as to be displaceable in a reciprocating motion;
   a fresh air tract for the second cylinder, in which an expansion/compression machine is disposed in a direction of flow of fresh air before a gas exchange inlet valve of the second cylinder; and
   an exhaust tract for the second cylinder, wherein the expansion/compression machine is the first cylinder,
   wherein
   a gas exchange inlet side and a gas exchange outlet side of the first cylinder are interchangeable;
   the fresh air tract between an intake temperature regulator and the gas exchange outlet side can be divided by a second actuating element;
   the fresh air tract can be connected by means of a first actuating element to the gas exchange inlet side of the first and second cylinder;
   the gas exchange outlet side of the first cylinder can be connected by means of a third actuating element to the exhaust gas tract before the heat exchanger; and
   the first cylinder can be operated in a four-stroke operation.

6. The reciprocating internal combustion engine according to claim 5, wherein a charge air cooler is disposed in the fresh air tract in the flow direction of the fresh air in each case before the first and the second cylinder.

7. The reciprocating internal combustion engine according to claim 1, wherein a compressor of a turbomachine is disposed in the fresh air tract in the flow direction of the fresh air before the heat exchanger.

8. The reciprocating internal combustion engine according to claim 7, wherein the turbomachine is an exhaust gas turbocharger and a turbine of the exhaust gas turbocharger is disposed in the exhaust tract, in the flow direction of an exhaust gas before the heat exchanger.

9. A method for operating the reciprocating internal combustion engine according to claim 1 at a low to medium required load and/or power, wherein the method comprises the acts of:
   performing a fired operation of the second cylinder;
   discharging an exhaust gas from the second cylinder in the exhaust gas tract;
   heating uncompressed fresh air in the heat exchanger;
   drawing in the uncompressed heated fresh air by the first cylinder;
   expanding the heated fresh air; and
   delivering the expanded heated fresh air to the second cylinder.

10. The method according to claim 9, further comprising operating the first cylinder in a two-stroke operation.

11. The method according to claim 9, further comprising compressing the fresh air by the compressor before heating in the heat exchanger.

12. A method for operating the reciprocating internal combustion engine according to claim 5 at a low to medium required load and/or power, wherein the method comprises the acts of:
   opening of the first actuating element;
   closing of the second actuating element;

opening of the third operating element;
performing fired operation of the first and second cylinder in a four-stroke operation; and
discharging of the exhaust gases from the first and second cylinder in the exhaust gas tract.

13. The method according to claim 12, further comprising compressing the fresh air by the compressor before delivery to the first and second cylinder.

14. The method according to claim 13, further comprising cooling the compressed fresh air by the compressor before delivery to the first and second cylinder.

* * * * *